United States Patent
Hailey et al.

(10) Patent No.: US 9,651,190 B1
(45) Date of Patent: May 16, 2017

(54) SYSTEM AND METHOD OF PREVENTING FLOW BLOCKING WHEN USING AN AUTOMATED PIG LAUNCHER

(71) Applicant: TDW Delaware, Inc., Wilmington, DE (US)

(72) Inventors: Jeffrey C. Hailey, Tulsa, OK (US); Lee R. Shouse, Jr., Chelsea, OK (US); William C. Keenan, Broken Arrow, OK (US); Troy D. Geren, Tulsa, OK (US); Tarek Kandalaft, Tulsa, OK (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 14/989,442

(22) Filed: Jan. 6, 2016

(51) Int. Cl.
*B08B 9/00* (2006.01)
*F16L 55/46* (2006.01)

(52) U.S. Cl.
CPC .................... *F16L 55/46* (2013.01)

(58) Field of Classification Search
CPC ....... B08B 9/027; B08B 9/023; B08B 7/0071; B08B 17/02; B08B 7/028; B08B 1/001; B08B 9/032; E21B 43/36; E21B 37/00; B06B 1/0215
USPC ......................................................... 134/22.1
See application file for complete search history.

(56) References Cited

U.S. PATENT DOCUMENTS

| | | | | |
|---|---|---|---|---|
| 4,135,949 A | * | 1/1979 | Reese ..................... | F16L 55/46 134/18 |
| 2007/0110864 A1 | * | 5/2007 | Galloway ............... | B08B 9/032 426/512 |
| 2010/0252260 A1 | * | 10/2010 | Fowler ..................... | F17D 1/17 166/275 |
| 2014/0067268 A1 | * | 3/2014 | Tunheim ............ | G01N 21/8507 702/2 |
| 2015/0045969 A1 | * | 2/2015 | Abney ................. | G05D 7/0641 700/282 |

OTHER PUBLICATIONS

Wilkinson, Automatic Multriple Cleaning Pig Launching System Passes Test, Aug. 2011, Pipeline & Gas Journal, vol. 238 No. 8, p. 1-10.*

* cited by examiner

*Primary Examiner* — Binh X Tran
*Assistant Examiner* — David Cathey, Jr.
(74) *Attorney, Agent, or Firm* — Gable Gotwals

(57) ABSTRACT

A flow assurance system and method includes procedures to query current valve states and determine the likely effect of new valve states on product flow when using an automated pig launcher. The system and method allows for modulating the mainline bypass valve, kicker valve, and isolation valve between fully opened and fully closed states; prevents flow blocking of the pipeline during this modulation; enables new and different, as well as a broader range of, pig launching options for an automatic pig launcher; and integrates with existing automatic pig launchers.

7 Claims, 5 Drawing Sheets

SYSTEM AND METHOD OF PREVENTING FLOW BLOCKING WHEN USING AN AUTOMATED PIG LAUNCHER

BACKGROUND OF THE INVENTION

This invention relates to launchers used to launch a pipeline pig into a pipeline system. More specifically, the invention relates to systems and methods of preventing flow blocking when launching a pig using an automated pig launcher.

Pipeline pigs perform various pipeline maintenance, cleaning and inspection operations while the pipeline continues to operate under pressure and transport product. The pig is introduced into the pipeline by way of a trap (the "pig launcher") connected to the pipeline. Once the pig is placed inside the launcher, the closure door of the launcher is closed and pipeline flow is used to push the pig into and through the pipeline. The pig continues to travel through the pipeline until the pig reaches a receiving trap (the "pig catcher").

Referring to FIG. 1, a prior art pig launching system uses gravity to launch a pig into a main pipeline. Pipeline product is diverted into and flows through the launcher when the kicker and isolation valves are opened and the mainline bypass valve is closed, Pig launching and receiving systems vary from one to another depending on specific purpose and pipeline product. Variations include such things as placement of valves, length of the launch tube or barrel, type of closure door, and the means to move a pig into the reduced cross-section area of the barrel (e.g. gravity, screws).

Regardless of those variations, all launchers and receiver include the barrel which holds one or more pigs, a large branch connection which connects the barrel to the pipeline system, and a set of valves that divert and control flow through and to the launcher (see e.g. FIG. 1). The set of valves typically includes the mainline bypass valve, mainline trap or isolation valve, and trap kicker or kicker valve. When ready to launch a pig into the pipeline system, a Tee section diverts pipeline fluid flow into the end of the barrel, behind one or more of the pigs positioned in the barrel.

In order to launch itself properly into the pipeline, the pig must experience an adequate pressure differential across the pig body. Gravity assistance can be used to move the pig into a position to better accomplish this. Referring to FIG. 1, a prior art pig launching system uses gravity to launch a pig into a main pipeline. Pipeline product is diverted into and flows through the launcher when the kicker and isolation valves are opened and the mainline bypass valve is closed, The ability to control bypass flow through the pig body, therefore, is critical to providing sufficient acceleration of the pig during its launch into the pipeline and controlling the speed of the pig as it travels through the pipeline. In many cases—such as those where minimal flow is available to push the pig out of the launcher and into the pipeline—it is desirable to have minimum to no bypass flow through the pig during the initial launch phase, that is, up until the time at which the pig passes the isolation valve.

U.S. Pat. No. 4,135,959 to Reese discloses monitoring the operating condition of a pig launcher to prevent opening of the launcher closure when there is a pressure in the launcher and to prevent flow into the launcher when the launcher closure is not in place. For example, the override maintaining the isolation valve in a closed position cannot be removed until the pressure in the barrel reaches a set point of about ½ to 1 psig.

Fully automated pig launchers have the potential to launch pigs in ways that manual and semi-automated pig launchers could not. For example, a fully automated system could modulate the mainline bypass valve to create differential pressure sufficient to launch a pig without the use of gravity assistance. However, this modulation could potentially block product flow in the pipeline by closing or partially closing the mainline bypass valve when the kicker or isolation valves are closed or partially closed. Therefore, a need exists for a system and method to prevent this flow blocking and assure adequate flow of pipeline product.

SUMMARY OF THE INVENTION

A flow assurance system and method of launching a pipeline pig involves the following components and steps, with the steps of the flow assurance module being executed by a set of computer executable instructions stored on non-transitory computer readable medium and executed by a microprocessor. The requests or commands to query valve states, change or stop changes to valve states, and to reverse valve states can occur over a network in communication with the valve controllers and valve- and pressure indicators. The steps include:
  querying a mainline bypass valve indicator, a kicker valve indicator, and an isolation valve indicator;
  determining, using indicator data from the valve indicators, a current state of each of the valves, the current state being in a range of fully opened to fully closed;
  sending a request to change the current state of one or more of the valves to a new state, the new state being different than the current state and in a range of fully opened to fully closed;
  determining, using the current state of valves left unchanged and the new state of valves to be changed, an effect on product flow in a mainline, the effect ranging one an increased, decreased, or unchanged product flow;
  denying the request if the effect is undesirable; and
  modulating the one or more valves to the new state if the effect is desirable (e.g., at least one of the kicker valve and the isolation valve current state is closed and the requested new state of the mainline bypass valve is closed).

The current state of the valves is verified prior to the sending request step and after the modulating step.

The method also can include the steps of querying pressure indicators located upstream and downstream of the mainline bypass valve; calculating, using the pressure data from the pressure indicators, a differential pressure across the mainline bypass valve; and comparing the differential pressure to a predetermined differential pressure. Modulation of a valve can be stopped before it reaches the new state if the differential pressure is not within a predetermined range. The modulation can then be reversed to bring the stopped valve back to its last known current state.

Objectives of this invention are to provide flow assurance when using an automated pig launcher and modulating the mainline bypass valve; prevent flow blocking of the pipeline during this modulation; enable new and different, as well as a broader range of, pig launching options for an automatic pig launcher; and provide a flow assurance system and method that can integrate with existing automatic pig launchers.

ELEMENTS AND NUMBERING USED IN THE DRAWINGS AND DETAILED DESCRIPTION

Figure 1:
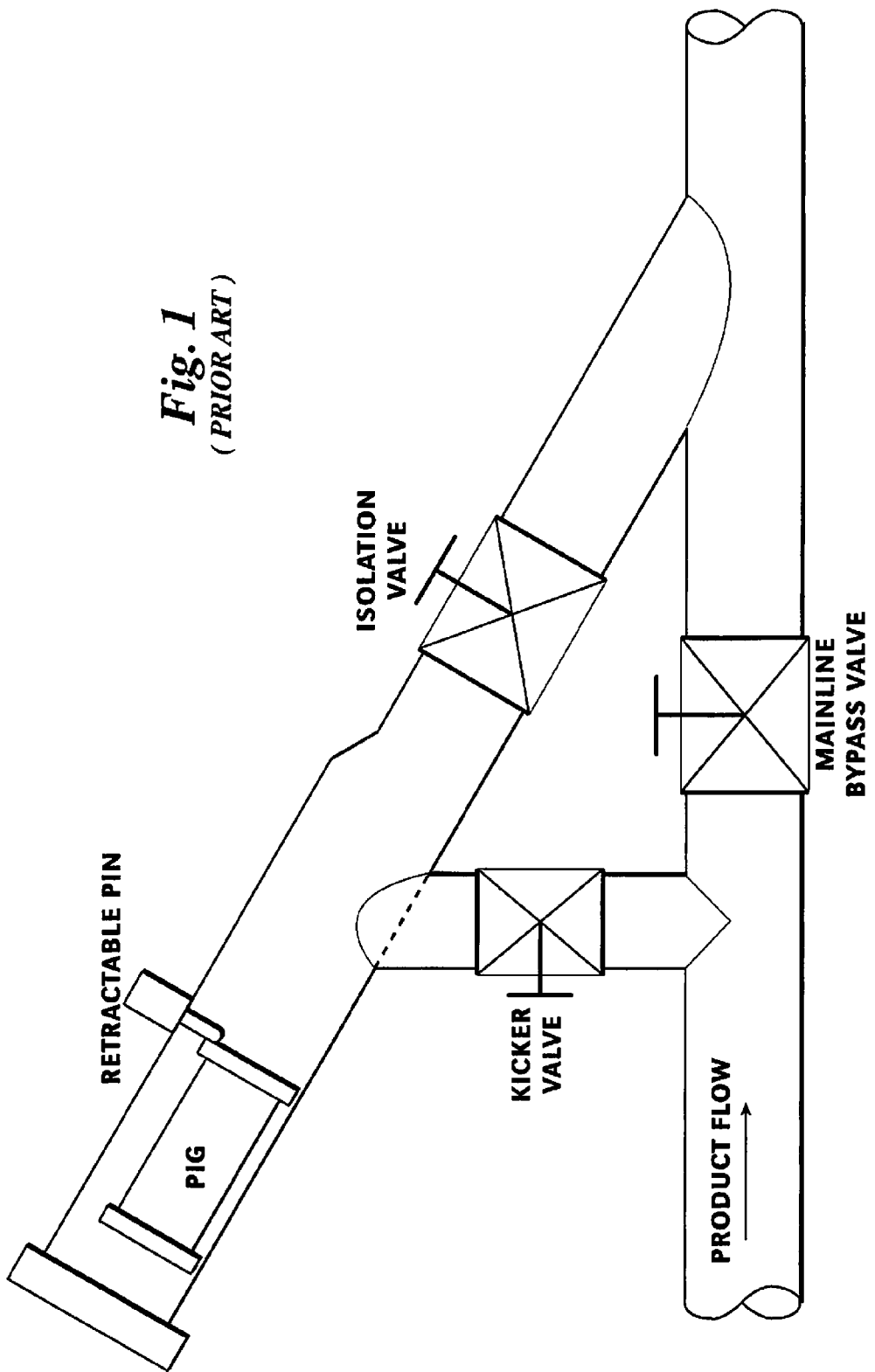
FIG. 1 is a schematic of a prior art gravity assisted pig launching system and its associated valves.

10 Automated pig launcher
11 Launcher barrel
13 Mainline bypass
15 Mainline
17 Tee Section
18 Retractable pin or launch pin
19 Upstream pressure indicator
21 Mainline bypass valve
23 Mainline bypass valve indicator
25 Kicker valve
27 Kicker valve indicator
29 Isolation valve
31 Isolation valve indicator
33 Downstream pressure indicator
35 Upstream flow meter
37 Downstream flow meter
39 Pig signal indicator
40 Communication interface or network
50 Computing device
51 Computer readable media
53 Memory
55 Microprocessor
60 Flow assurance module and method
70 Valve change procedure
71 Operator acknowledgement regarding current valve states
73 Valve state verification
75 Request to change valve state
77 Determine effect on product flow
79 Operator acknowledgement to stop flow
81 Modulate valve to requested new state
83 Check differential pressure against predetermined range
85 Determine whether valve is in the requested new state
87 Verify valve indicator matches new state
90 Error procedure
91 Stop all operations
93 Indicate error state
95 Error while modulating valve between current and requested new state
97 Reset valve to last known state
99 Receive acknowledgement before re-start of operations

DETAILED DESCRIPTION OF THE PREFERRED EMBODIMENTS

Figure 2:
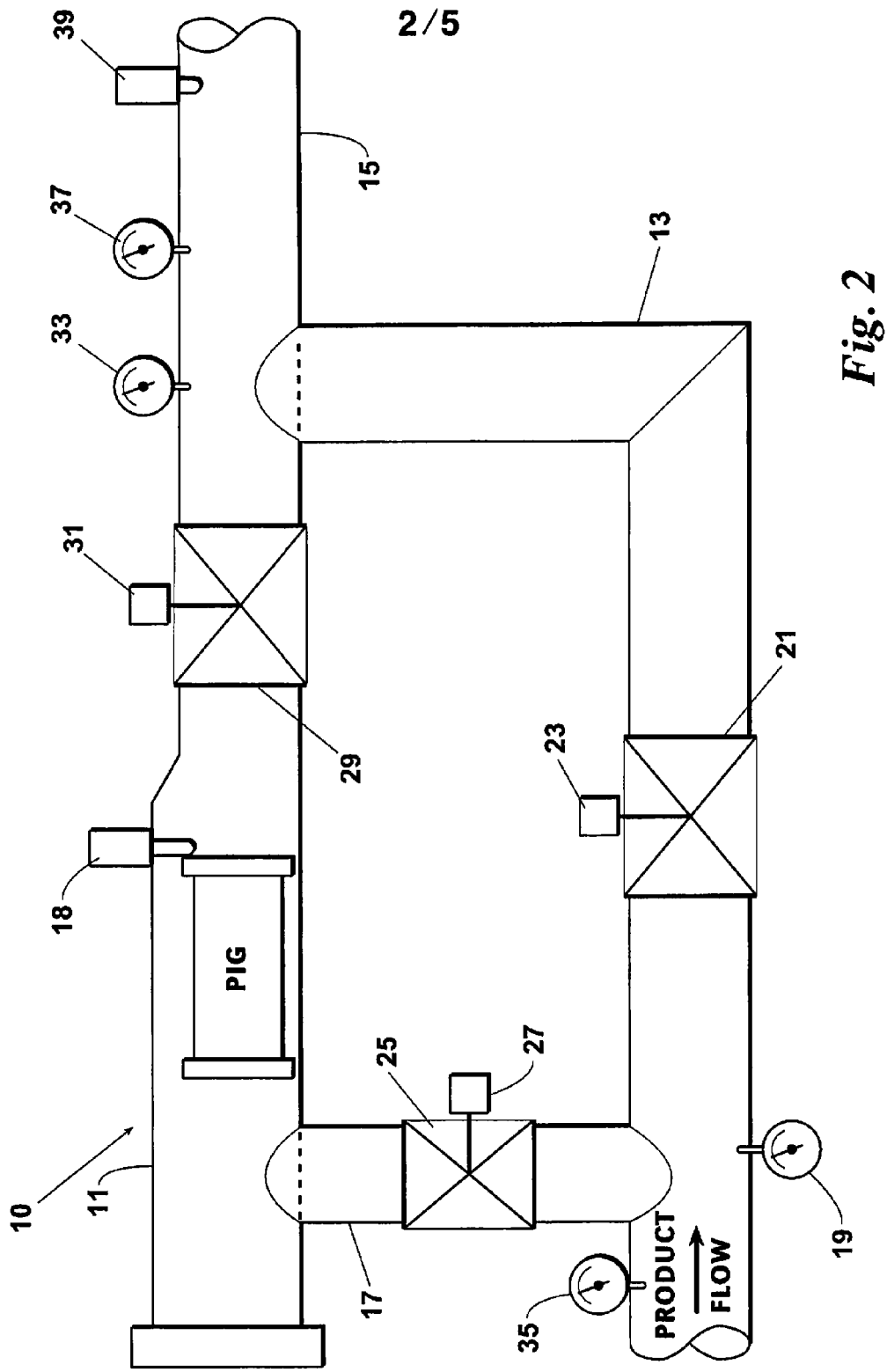
FIG. 2 is a schematic of a preferred embodiment of a pig launching system and its associated valves and sensors.
Figure 3:
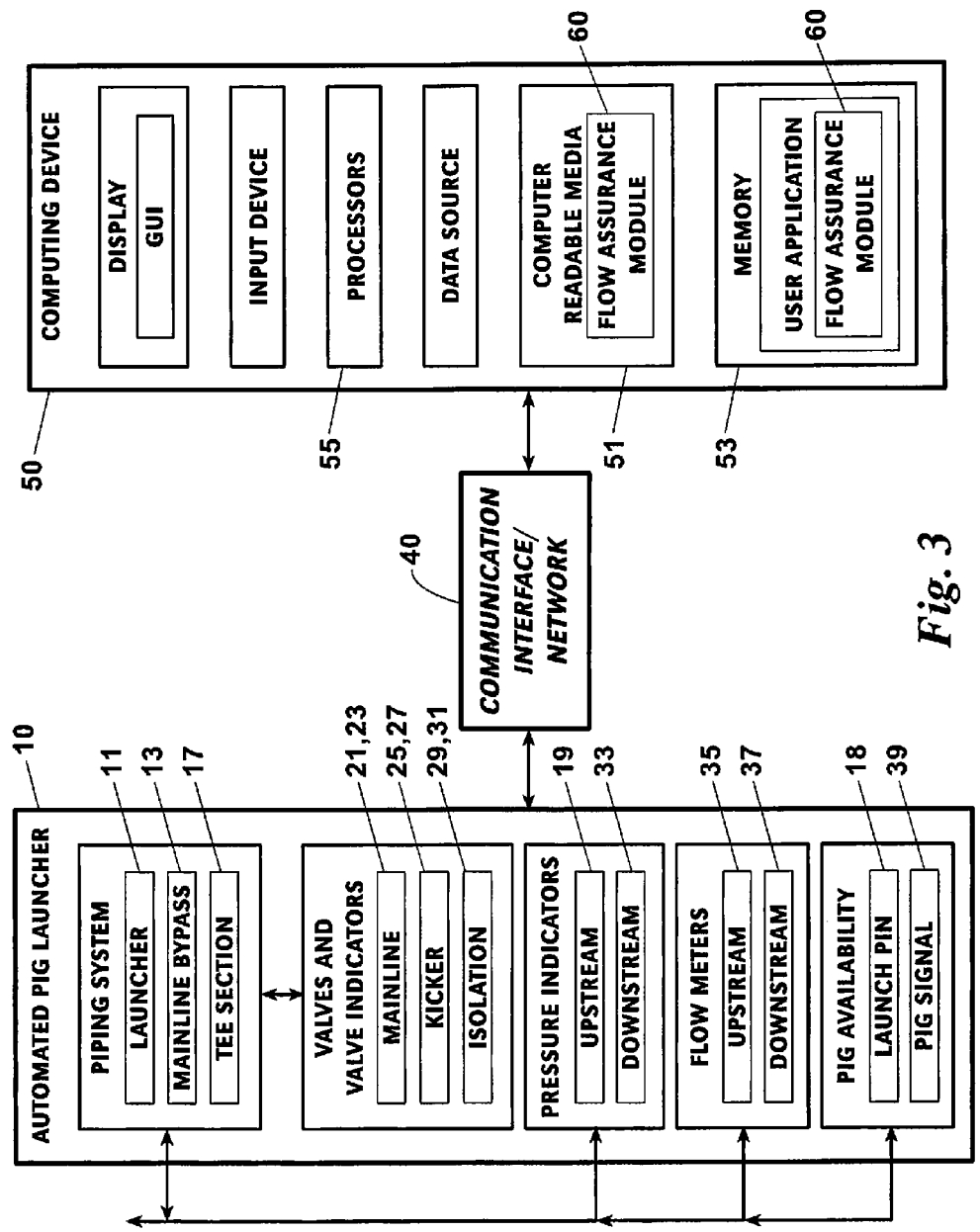
FIG. 3 is a schematic of a preferred embodiment of a control system used in connection with the pig launcher of FIG. 2 to prevent flow blocking of the pipeline.

Referring to FIGS. 2 and 3, a valve monitoring and flow assurance system and method for use with an automated pig launcher 10 prevents blocking product flow of a pipeline while changing valve states, including valve state changes made without human intervention.

The launcher 10 includes a launcher barrel 11, a mainline bypass 13 connected to a mainline 15, and a tee section 17. A launch pin 18 holds a pig in its launch position and, once launched, a pig signal indicator 39 indicates its passage into the mainline 15. The valves—which includes the mainline bypass valve 21, kicker valve 25, and isolation valve 29—are each monitored by a respective valve indicator 23, 27, 31 to determine whether the valve 21, 25, 29 is correctly indicating a known state.

The launch pin 18, valve indicators 23, 27, 31, and pig signal indicator 39 are in communication with a communication interface 40—which can be connected to or part of a PLC network or a mobile network—in communication with a computing device 50 having a flow assurance module 60 (see FIG. 3). The same is true of pressure sensors or indicators 19, 33 and flow meters 35, 37.

Valve state data from the valve indicators 23, 27, 31, differential pressure data from pressure indicators 19, 33, and flow data from meters 35, 37 are passed through the interface 40 for processing by one or more microprocessors 55 of computing device 50. The microprocessor 55, together with the computer-readable media 51 and memory 53 of the computing device 50, implements a flow assurance module 60. The known number of pigs loaded into the launcher barrel 11, along with data from the retractable pin 18 and pig signal indicator 39, is used to determine available pig status.

Figure 4:
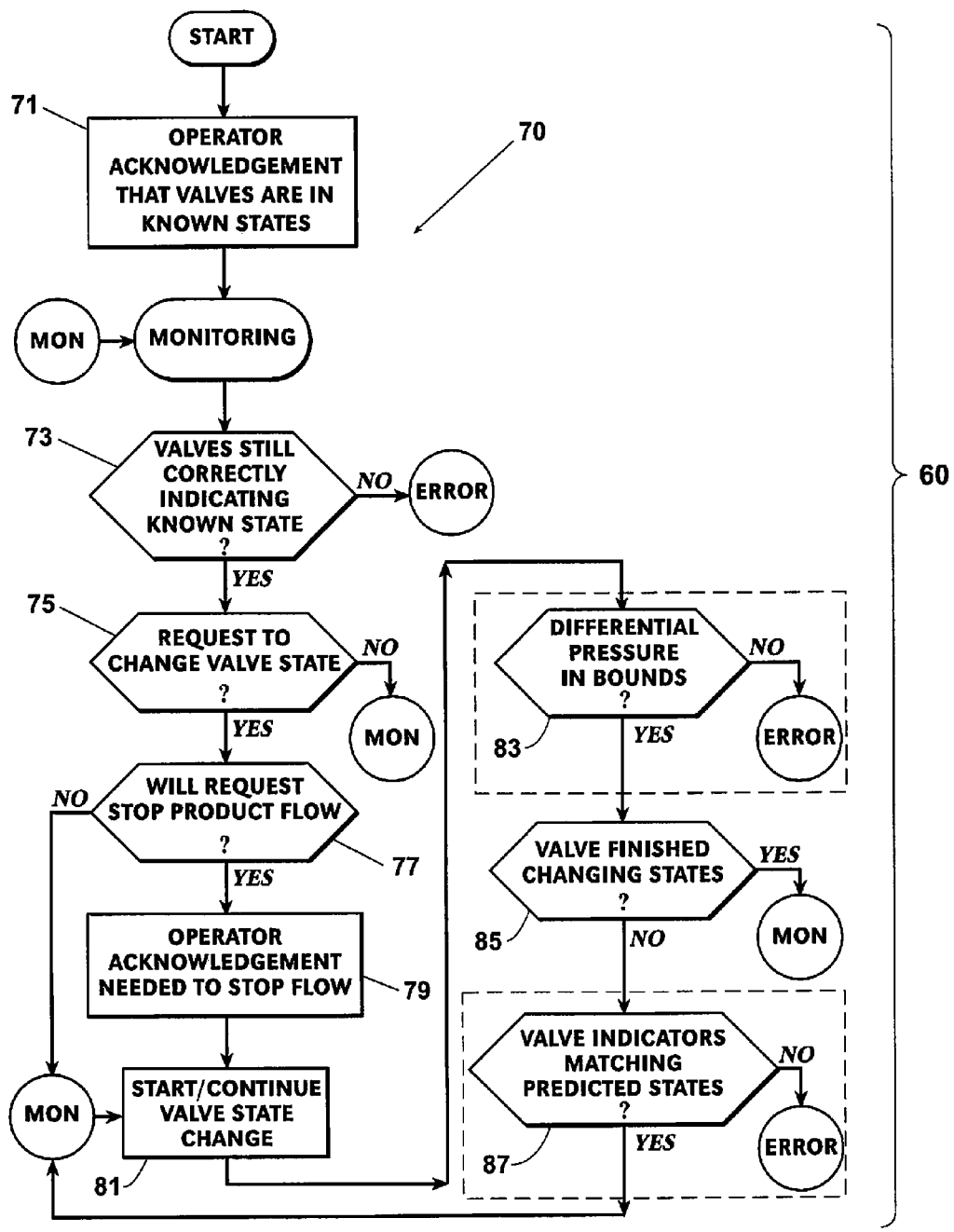
FIG. 4 is a flow diagram of a preferred embodiment of a valve monitoring and flow assurance process.

Referring to FIG. 4, the flow assurance module 60 includes a valve change procedure 70 which executes various checks and processes various requests to the valves. The valve change procedure 70 begins with operator acknowledgement 71 regarding current valve states. If a valve state is verified 73, and the same holds true of the other valve states, then a request 75 can be sent to change one or more of the valve states between this known state and a second state. For example, the request 75 could be directed toward modulating flow through the mainline bypass valve by changing its state between a first partially opened state and a second partially opened state, the flow through the mainline bypass valve in the second state being greater than (or less than) that in the first state.

The request 75 is then evaluated 77 to determine whether changing the one or more valve states, given the current state of a valve or valves, is desirable, thereby bringing the system into a desired operating condition, or undesirable, such as one that could stop or block product flow:

If MAINLINE=open, then KICKER=open or closed, ISOLATION=open or closed, OR KICKER & ISOLATION=both open or both closed;

IF MAINLINE=closed, then KICKER≠closed and ISOLATION≠closed;

IF KICKER=closed, or if ISOLATION=closed, then MAINLINE≠closed;

IF KICKER & ISOLATION=open, then MAINLINE=open or closed.

If blocking is, or is likely, to occur, then operator acknowledgement 79 is needed to change the valve state. If blocking is not going to occur, then the request 75 is implemented 81 and the one or more valves change states, with differential pressure 83 upstream and downstream of the mainline bypass valve being monitored to determine whether it is within the proper upper and lower bounds. Once the one or more valves have finished changing states, the valves are again monitored 87 to determine whether the valve indicators are matching a predicted state 85.

Figure 5:
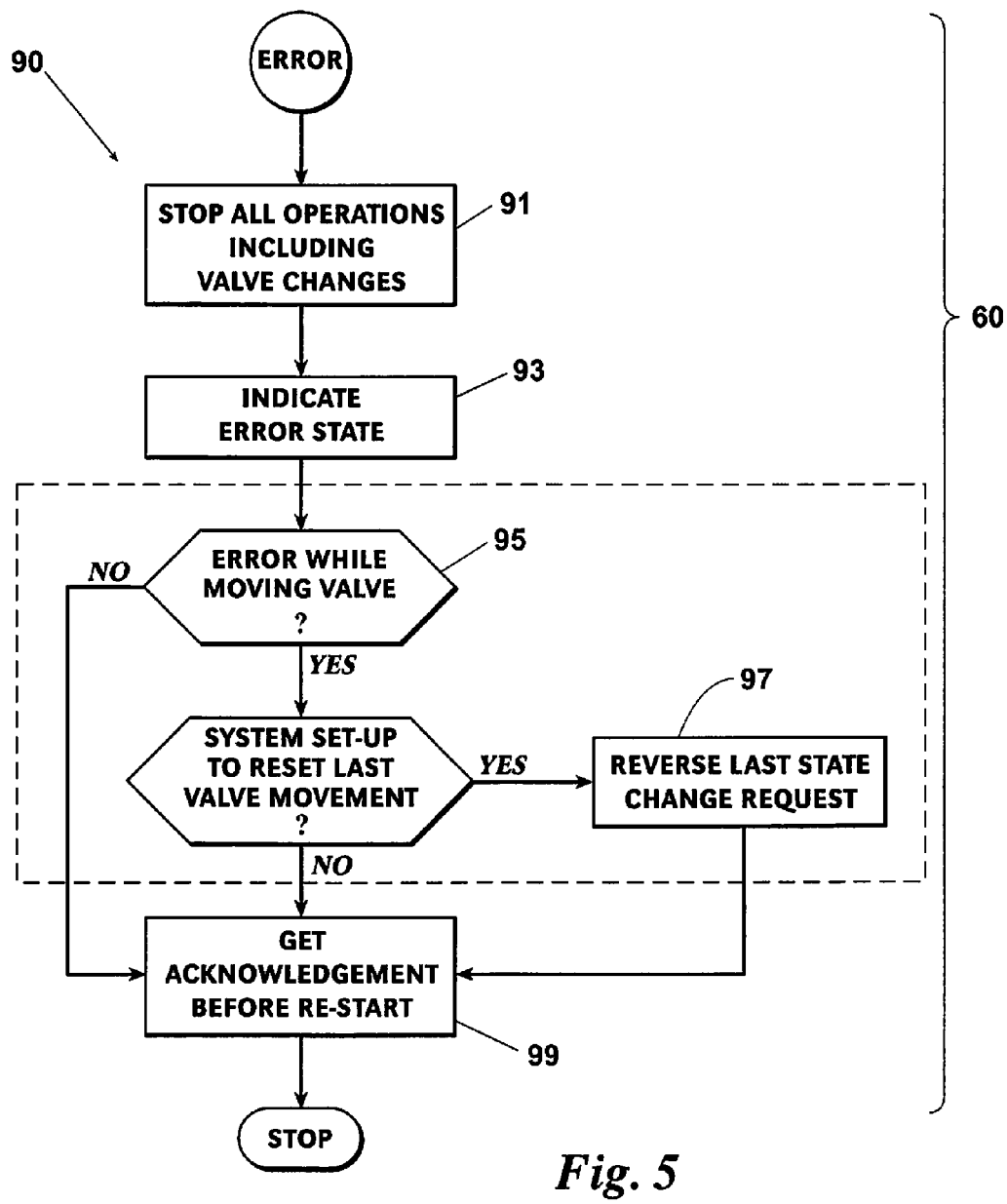
FIG. 5 is a flow diagram of a preferred embodiment of the error procedure for the valve monitoring and flow assurance process of FIG. 4.

Referring to FIG. 5, if an error is received, an error procedure 90 is started, all operations are stopped 91, including valve changes. For example, if the error indicator 93 indicates the error occurred while moving one of the valves between states 95, and if the system is set-up to reset the valve to its previous state, then the state change request 75 is reversed 97 to bring the valve back to its previous state. Operator acknowledgement 99 of the error correction is required before the re-start of operations.

The preferred embodiments described above provide examples of the flow assurance system and method defined by the following claims, including the range of equivalents to which the claim language is entitled.

What is claimed:

1. A method of launching a pipeline pig, the method being executed by a set of computer executable instructions stored on non-transitory computer readable medium and executed by a microprocessor, the method comprising the steps of:
   querying a mainline bypass valve indicator, a kicker valve indicator, and an isolation valve indicator;
   determining, using indicator data from the valve indicators, a current state of each of the valves, the current state being in a range of fully opened to fully closed;
   sending a request to the microprocessor to change the current state of one or more of the valves to a new state, the new state being different than the current state and in a range of fully opened to fully closed;
   determining, using the microprocessor and the current state of valves left unchanged and the new state of valves to be changed, an effect on product flow in a mainline, the effect being one of increasing the product flow or decreasing the product flow; denying the request if the product flow associated with the valves left unchanged is within a predetermined range; and modulating the one or more valves to the new state if the product flow associated with the valves left unchanged is outside the predetermined range; launching the pipeline pig into the mainline.

2. A method according to claim 1 wherein the request is denied if at least one of the kicker valve and the isolation valve current state is closed and the requested new state of the mainline bypass valve is closed.

3. A method according to claim 1 further comprising the steps of
   querying pressure indicators located upstream and downstream of the mainline bypass valve;
   calculating, using the pressure data from the pressure indicators, a differential pressure across the mainline bypass valve; and
   comparing the differential pressure to a predetermined differential pressure.

4. A method according to claim 3 further comprising the step of stopping modulation of a valve before it reaches the new state if the differential pressure is not within a predetermined range.

5. A method according to claim 4 further comprising the step of reversing modulation of the stopped valve back to its last current state.

6. A method according to claim 1 further comprising the step of verifying a current state of the valves prior to the sending request step.

7. A method according to claim 1 further comprising the step of verifying the new state of the one or more valves after the modulating step.

* * * * *